(12) United States Patent
Margolis et al.

(10) Patent No.: US 9,230,473 B2
(45) Date of Patent: Jan. 5, 2016

(54) DUAL DUTY CYCLE OLED TO ENABLE DYNAMIC CONTROL FOR REDUCED MOTION BLUR CONTROL WITH CONSTANT BRIGHTNESS IN AUGMENTED REALITY EXPERIENCES

(71) Applicant: Microsoft Technology Licensing, LLC, Redmond, WA (US)

(72) Inventors: Jeffrey Neil Margolis, Seattle, WA (US); Barry Corlett, Brisbane, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 13/925,086

(22) Filed: Jun. 24, 2013

(65) Prior Publication Data
US 2014/0375679 A1    Dec. 25, 2014

(51) Int. Cl.
*G09G 5/00*     (2006.01)
*G09G 3/32*     (2006.01)
*H04N 5/445*    (2011.01)
(Continued)

(52) U.S. Cl.
CPC .......... *G09G 3/3208* (2013.01); *G02B 27/017* (2013.01); *G06F 3/011* (2013.01); *G06T 19/006* (2013.01); *H04N 5/445* (2013.01); *H04N 5/57* (2013.01); *H04N 21/4122* (2013.01); *H04N 21/4126* (2013.01); *H04N 21/42202* (2013.01); *H04N 21/431* (2013.01); *G02B 2027/014* (2013.01); *G02B 2027/0118* (2013.01);
(Continued)

(58) Field of Classification Search
CPC ....... G06F 3/011; G06F 3/012; G06F 3/0346; G06F 3/014; G02B 27/017; G06T 19/006; G09G 3/3208
See application file for complete search history.

(56) References Cited

U.S. PATENT DOCUMENTS 7,317,445 B2   1/2008  Hekstra et al.
8,294,375 B2   10/2012 Lee
(Continued)

FOREIGN PATENT DOCUMENTS

EP          1722342 A1    11/2006
WO     WO03/091983 A1     6/2003
WO     2004093023 A2     10/2004

OTHER PUBLICATIONS

"International Search Report & Written Opinion for PCT Patent Application No. PCT/US2014/042891", Mailed Date: Aug. 29, 2014, Filed Date: Jun. 18, 2014, 13 Pages.
(Continued)

*Primary Examiner* — Lixi C Simpson
(74) *Attorney, Agent, or Firm* — Dan Choi; Judy Yee; Micky Minhas

(57) ABSTRACT

A head-mounted display (HMD) device is provided with reduced motion blur by reducing row duty cycle for an organic light-emitting diode (LED) panel as a function of a detected movement of a user's head. Further, a panel duty cycle of the panel is increased in concert with the decrease in the row duty cycle to maintain a constant brightness. The technique is applicable, e.g., to scenarios in which an augmented reality image is displayed in a specific location in world coordinates. A sensor such as an accelerometer or gyroscope can be used to obtain an angular velocity of a user's head. The angular velocity indicates a number of pixels subtended in a frame period according to an angular resolution of the LED panel. The duty cycles can be set, e.g., once per frame, based on the angular velocity or the number of pixels subtended in a frame period.

20 Claims, 15 Drawing Sheets

(51) Int. Cl.
*H04N 5/57* (2006.01)
*G06F 3/01* (2006.01)
*G06T 19/00* (2011.01)
*H04N 21/41* (2011.01)
*H04N 21/422* (2011.01)
*H04N 21/431* (2011.01)
*G02B 27/01* (2006.01)
*H04N 21/4223* (2011.01)

(52) U.S. Cl.
CPC . *G02B2027/0178* (2013.01); *G02B 2027/0187* (2013.01); *H04N 21/4223* (2013.01)

(56) References Cited

U.S. PATENT DOCUMENTS

| | | | |
|---|---|---|---|
| 2002/0084463 | A1 | 7/2002 | Sanford et al. |
| 2003/0112207 | A1 | 6/2003 | Kim et al. |
| 2004/0196221 | A1 | 10/2004 | Shih |
| 2005/0203380 | A1* | 9/2005 | Sauer et al. .................. 600/417 |
| 2006/0012708 | A1 | 1/2006 | Rosmalen |
| 2006/0092143 | A1 | 5/2006 | Johnson et al. |
| 2006/0152452 | A1 | 7/2006 | Hoppenbrouwers et al. |
| 2010/0103075 | A1* | 4/2010 | Kalaboukis et al. .............. 345/8 |
| 2010/0149163 | A1 | 6/2010 | Betts-LaCroix |
| 2011/0080441 | A1 | 4/2011 | Wacyk et al. |
| 2011/0181561 | A1 | 7/2011 | Smith |
| 2012/0089049 | A1* | 4/2012 | Suarez et al. ................. 600/558 |
| 2013/0141312 | A1 | 6/2013 | Horberg et al. |
| 2013/0141421 | A1* | 6/2013 | Mount et al. .................. 345/419 |
| 2013/0242262 | A1* | 9/2013 | Lewis ........................... 351/209 |
| 2014/0087867 | A1* | 3/2014 | Hightower ..................... 463/31 |

OTHER PUBLICATIONS

Ng, Ricky, "Design and application of OLED display drivers," IIC-China/ESC-China 2004 Conference Proceedings, Apr. 2004, 4 pages.

Lee, Wonbok, et al, "White LED Backlight Control for Motion Blur Reduction and Power Minimization in Large LCD TV's," Journal of the Society for Information Display, vol. 17, Issue 1, Jan. 2009, 18 pages.

Rolland, Jannick, et al., "Head-Mounted Display Systems," Encyclopedia of Optical Engineering DOI, Mar. 2005, 14 pages.

Huang, Yifei, et al., "Static active-matrix OLED display without pixel refresh enabled by amorphous-silicon non-volatile memory," Journal of the ISD 18/11, Aug. 2010, 5 pages.

Dawson, R.M.A., et al., "A Polysilicon Active Matrix Organic Light Emitting Diode Display with Integrated Drivers," SID Symposium Digest of Technical Papers, vol. 30, Issue 1, May 1999, 4 pages.

"Sony Alpha SLT-A77 DSLR Digital Camera (Body Only)," [http://www.bhphotovideo.com/product/817858-REG/Sony_A77V_SLT_A77_Digital_Camera_Body.html], May 17, 2013, 5 pages.

* cited by examiner

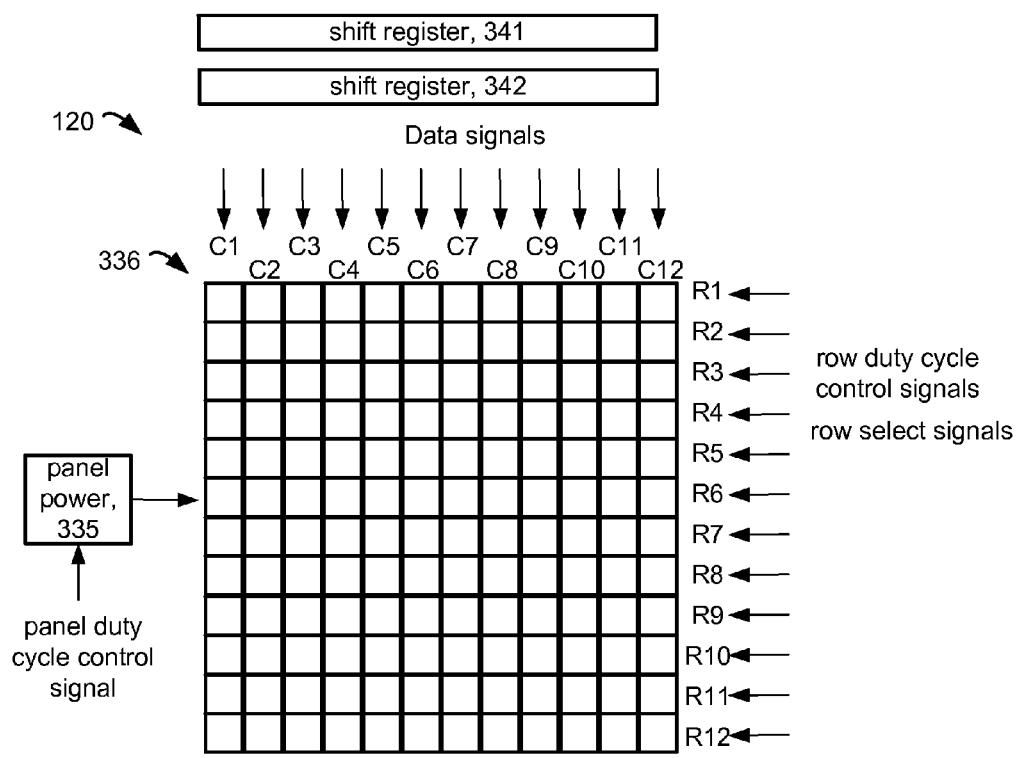

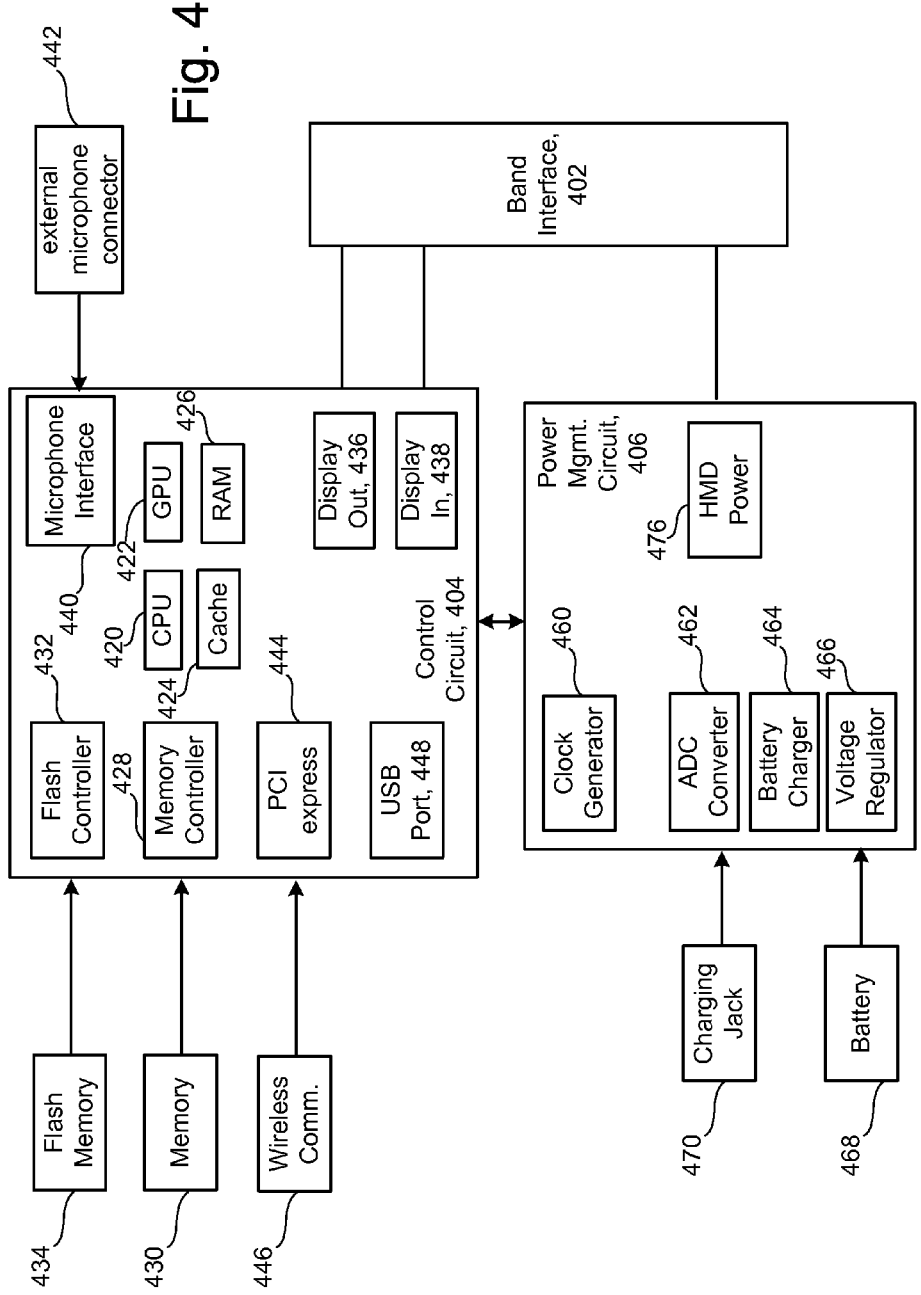

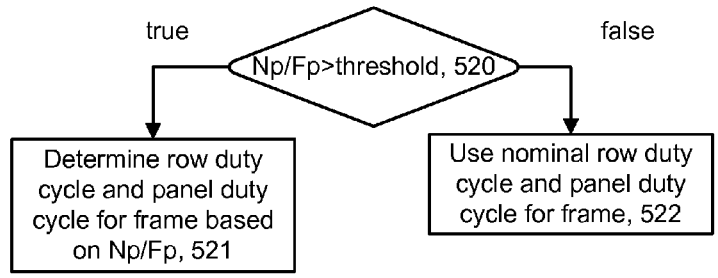
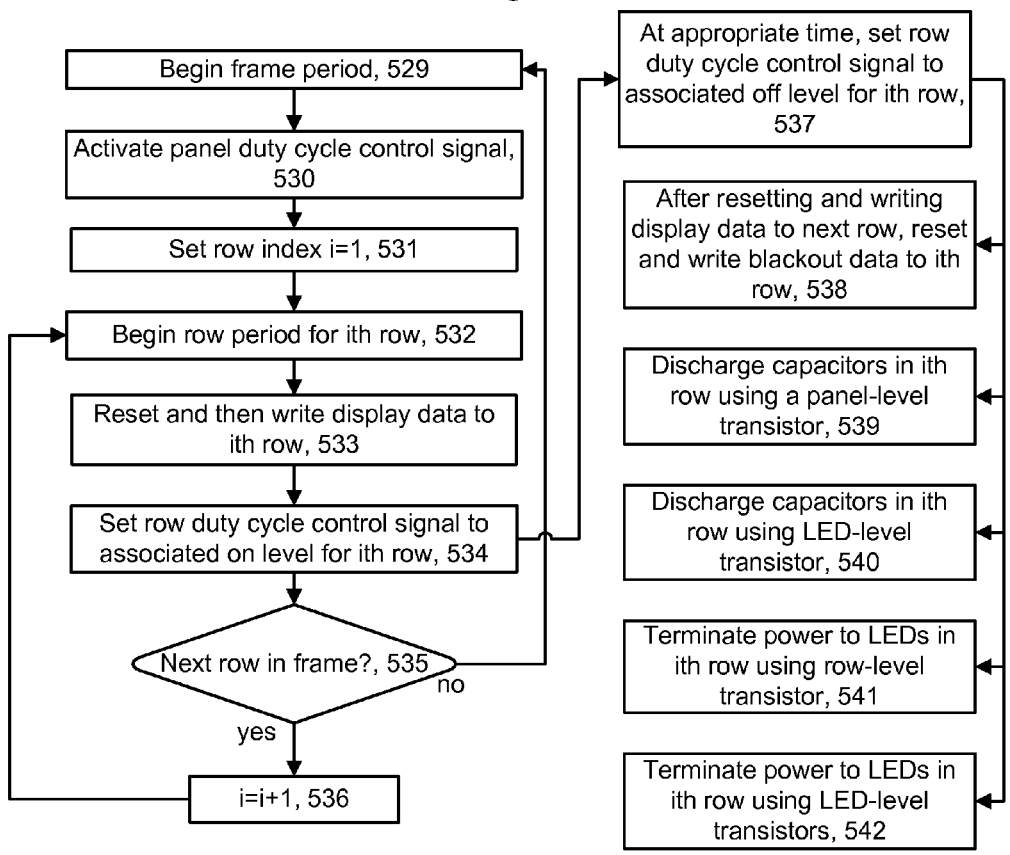

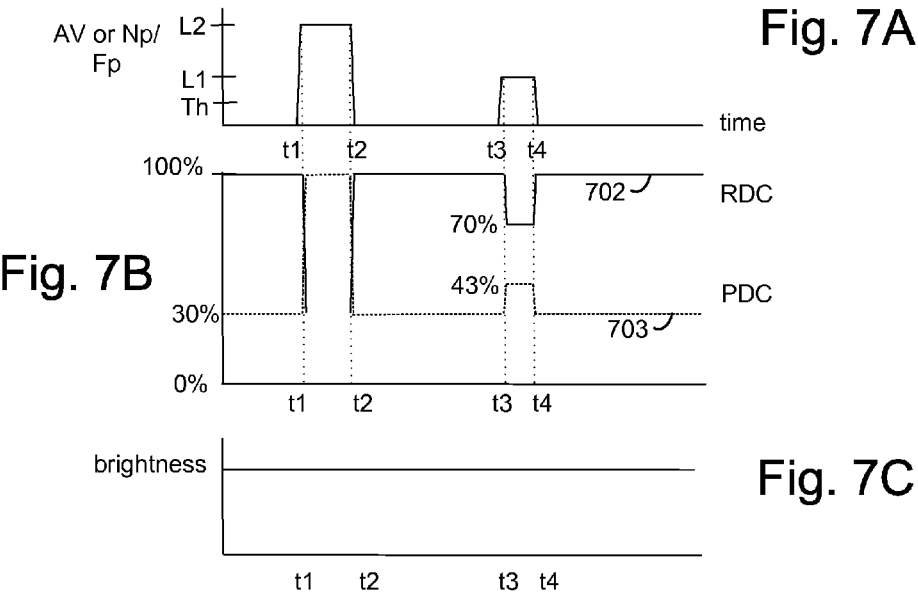
Fig. 7A
Fig. 7B
Fig. 7C
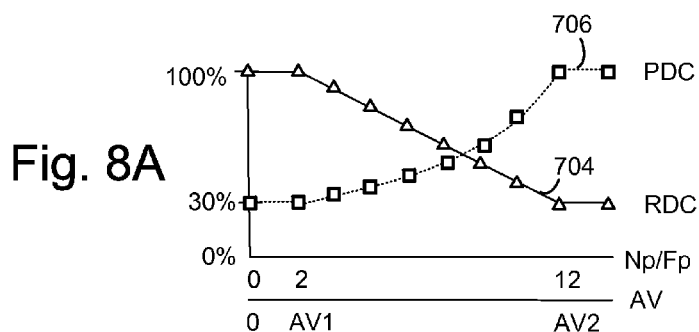
Fig. 8A
Fig. 8B 900, row 1

910, row 2

920, row NrxRDC/100+1

930, last row bazaar # DUAL DUTY CYCLE OLED TO ENABLE DYNAMIC CONTROL FOR REDUCED MOTION BLUR CONTROL WITH CONSTANT BRIGHTNESS IN AUGMENTED REALITY EXPERIENCES

BACKGROUND

Head-mounted display (HMD) devices can be used in various applications, including military, aviation, medicine, video gaming, entertainment, sports, and so forth. See-through HMD devices allow the user to observe the physical world, while optical elements add light from one or more small microdisplays into the user's visual path, to provide an augmented reality image. Similarly, immersive HMD devices provide an augmented reality image while the user is closed off from the physical world.

SUMMARY

Technology described herein is directed to an HMD device and to various embodiments for reducing or avoiding motion blur in an augmented reality image which is displayed by such a device. In scan-and-hold display technologies, a frame of image data is displayed and typically held for a frame period. While the frame is held, the user's head may move, resulting in motion blur.

In one approach, a head-mounted display device is provided which includes a microdisplay, a sensor and at least one control circuit. The microdisplay displays an augmented reality image, such as one or more frames of image data, and comprises a panel of light-emitting diodes (LEDs) arranged in rows. For example, organic LEDs (OLED) may be used due to their fast response time. The sensor can comprise an accelerometer or gyroscope, for example, which is secured to the HMD device and moves with the user's head. The sensor therefore senses an angular velocity of a user's head when the head is rotated. The rotation may occur when the user diverts their attention from the augmented reality image but still sees the augmented reality image in their field of view. The position of the augmented reality image may be locked to a real-world location at least during a current frame period. In this scenario, motion blur can occur because the image is not updated fast enough relative to the head motion. To address this, the at least one control circuit, to reduce motion blur of the augmented reality image, controls the microdisplay responsive to the angular velocity by concurrently decreasing a row duty cycle (RDC) of the rows and increasing a panel duty cycle (PDC) of the panel. The reduction in the row duty cycle of the rows results in reduced motion blur. Power savings and increased reliability may also be achieved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the drawings, like-numbered elements correspond to one another.

FIG. 3B depicts an example embodiment of the microdisplay 120 of FIG. 3A.

FIG. 4 is a block diagram of one embodiment of the components of the processing unit 4 of FIG. 1.

FIG. 5C depicts example details of step 503 of FIG. 5A for determining RDC and PDC which reduce motion blur while maintaining brightness.

FIG. 5D depicts example details of step 505 of FIG. 5A for displaying an augmented reality image locked to a location in a world coordinate system, using a determined RDC and PDC.

FIG. 7A depicts an example graph showing a head rotation as a function of time.

FIG. 7B depicts an example graph showing adjustments in a RDC and a PDC as a function of time, according to the head rotation of FIG. 7A.

FIG. 7C depicts an example graph showing a brightness level of an LED panel as a function of time, according to the RDC and PDC of FIG. 7B.

FIG. 8A depicts an example graph for setting RDC and PDC based on head rotation.

FIG. 8B depicts an example graph which is an alternative to FIG. 8A, where discrete levels of the RDC and the PDC are provided.

DETAILED DESCRIPTION

The technology described herein provides a head-mounted display device and a method for controlling such a device which reduces or avoids motion blur caused by movement of a user's head. As mentioned, display technologies such as a scanning, sample-and-hold approach, where each row of a panel is illuminated for the duration of a frame period, can result in motion blur when the user moves the head such as by rotating the head while viewing an augmented reality image such as a hologram or a virtual object that persists in world space. The technology provides a mitigation for such motion blur artifacts. Further, an additional measure allow for dynamic control of the motion blur while maintaining a constant brightness level, which would otherwise fluctuate with the motion blur.

Features of the technology include reducing the row duty cycle (RDC) of an LED panel to reduce perceived motion blur, providing dynamic control of row duty cycle based on a tracked velocity of a user's head, manipulating row duty cycle and panel pulse-width modulation (PWM) duty cycle in concert to dynamically reduce motion blur while maintaining constant brightness, and manipulating row and panel duty cycle (PDC) to optimize viewing conditions as well as extend panel lifetime.

Figure 1:
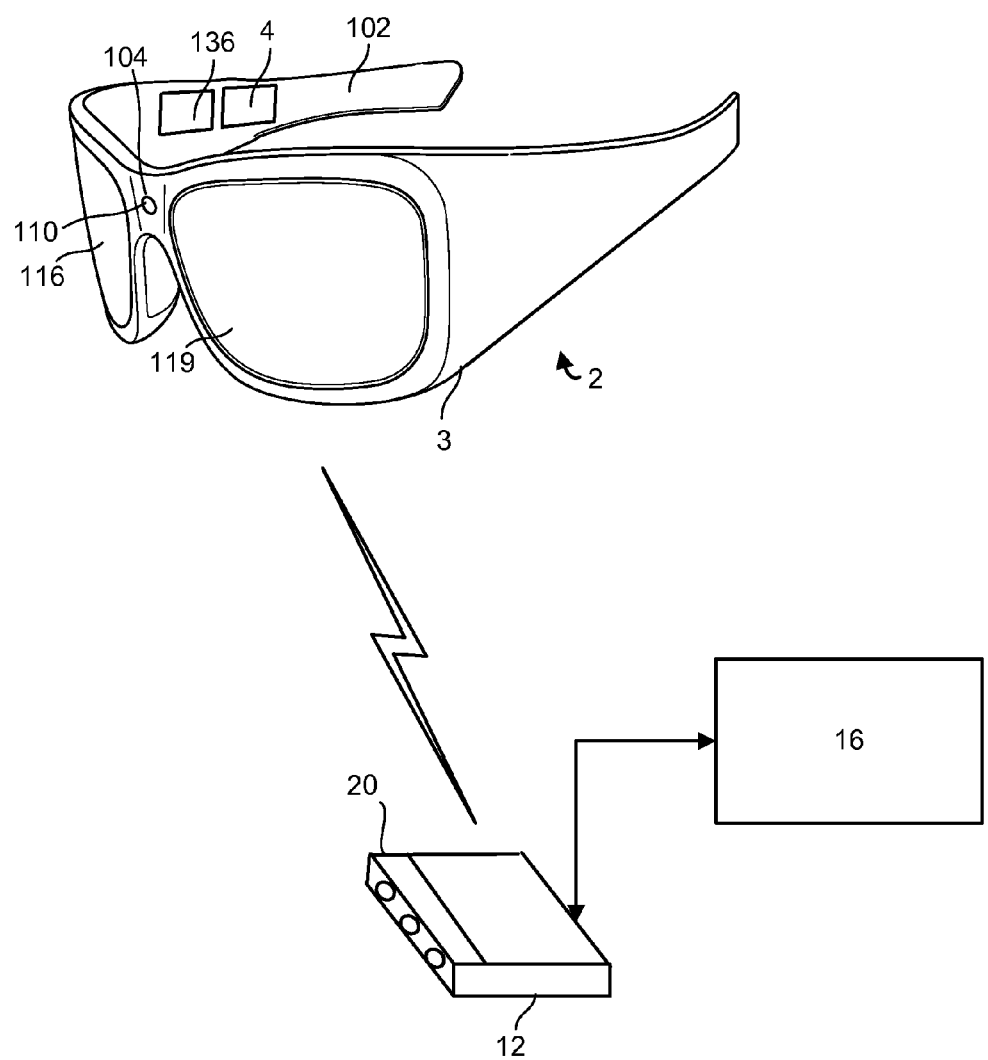
FIG. 1 is a block diagram depicting example components of one embodiment of an HMD device in communication with a hub computing system 12.

FIG. 1 is a block diagram depicting example components of one embodiment of an HMD device. The HMD device 2 includes a head-mounted frame 3 which can be generally in the shape of an eyeglass frame, and includes temple 102 and 103, and a front lens frame including a nose bridge 104. Built into nose bridge 104 is a microphone 110 for recording sounds, including spoken user commands, and transmitting corresponding audio data to processing unit 4. Lenses 116 and 119 are see-through. This is an example of a see-through near-to-the-eye HMD device. An immersive HMD device could alternatively be used.

The HMD device can be worn on the head of a user so that the user can see through a display and thereby see a real-world scene which includes an image which is not generated by the HMD device. The HMD device 2 can be self-contained so that all of its components are carried by the frame 3. Optionally, one or more components of the HMD device are not carried by the frame. For example, one of more components which are not carried by the frame can be physically attached by a wire to a component carried by the frame.

Further, one of more components which are not carried by the frame can be in wireless communication with a component carried by the frame, and not physically attached by a wire or otherwise to a component carried by the frame. The one or more components which are not carried by the frame can be carried by the user, in one approach, such as on the wrist. For example, the processing unit 4 could be connected to a component in the frame via a wire or via a wireless link. The term "HMD device" can encompass both on-frame components and associated off-frame components.

The processing unit 4 includes much of the computing power used to operate HMD device 2. The processor may execute instructions stored on a processor readable storage device for performing the processes described herein. In one embodiment, the processing unit 4 communicates wirelessly with one or more hub computing systems 12 or to other HMDs or mobile devices such as cell phones. Control circuits 136 provide various electronics that support the other components of the HMD device 2.

Hub computing system 12 may be a computer, a gaming system or console, or the like. According to an example embodiment, the hub computing system 12 may include hardware components and/or software components to execute applications such as gaming applications, non-gaming applications, or the like. The hub computing system 12 may include a processor that may execute instructions stored on a processor readable storage device for performing the processes described herein.

Hub computing system 12 further includes one or more capture devices, such as a capture device 20. The capture device 20 may be, for example, a camera that visually monitors one or more users and the surrounding space such that gestures and/or movements performed by the one or more users, as well as the structure of the surrounding space, may be captured, analyzed, and tracked to perform one or more controls or actions.

Hub computing system 12 may be connected to an audio-visual device 16 such as a television, a monitor, a high-definition television (HDTV), or the like that may provide game or application visuals.

Figure 2:
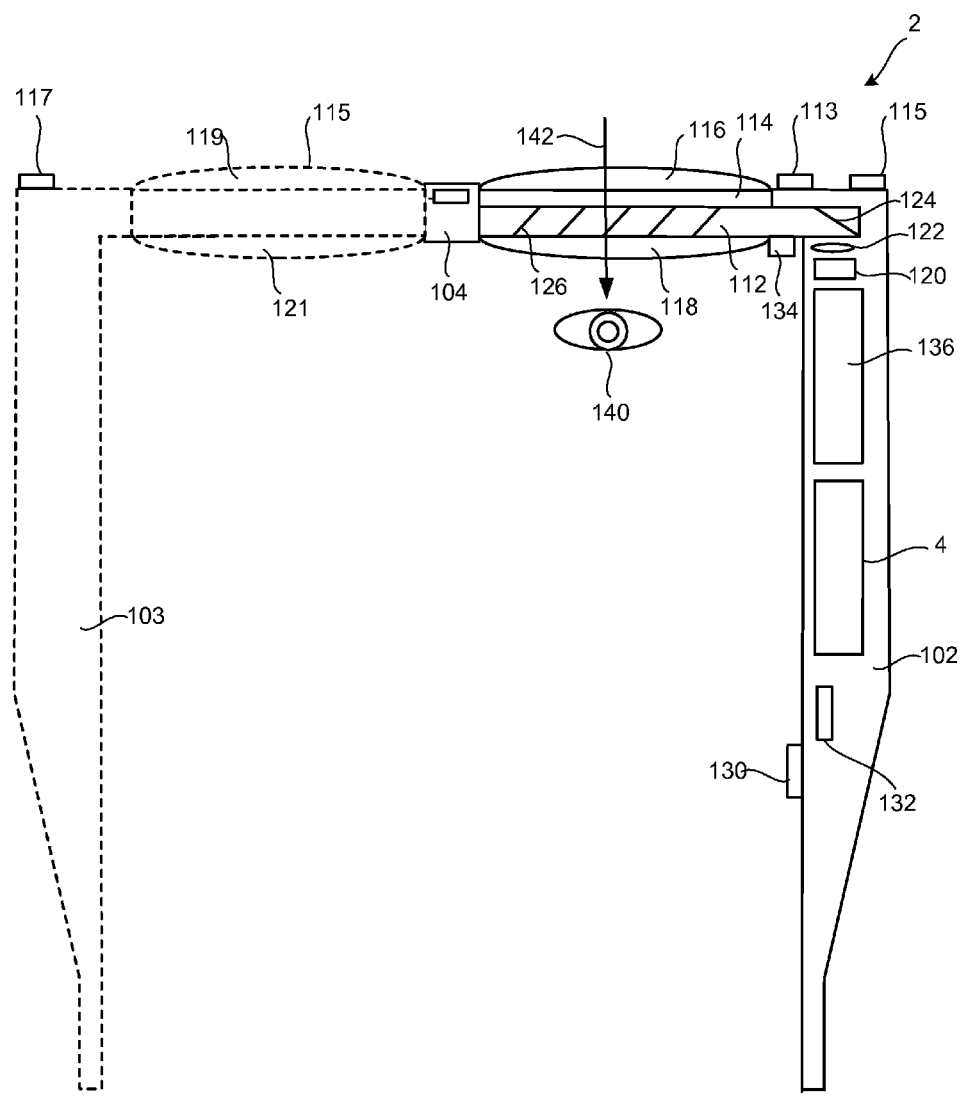
FIG. 2 is a top view of a portion of one embodiment of an HMD device.

FIG. 2 depicts a top view of a portion of HMD device 2, including a portion of the frame that includes temple 102 and nose bridge 104. Only the right side of HMD device 2 is depicted in detail. At the front of HMD device 2 are one or more forward- or room-facing cameras 113. The cameras can include at least one visible light video camera 113 that can capture video and still images, and transmit the images to processing unit 4, as described below. The camera can be used to identify real-world objections or location which are used to position an augmented reality image. Also, a depth sensor can be formed by the combination of an infrared emitter 115 and an infrared sensor/detector 117. The visible light video camera 113 may also be part of the depth sensor. The forward-facing video camera 113 faces outward and has a viewpoint similar to that of the user.

A portion of the frame of HMD device 2 surrounds a display that includes one or more lenses. To show the components of HMD device 2, a portion of the frame surrounding the display is not depicted. The display includes a light guide optical element 112, opacity filter 114, a front, right-side see-through lens 116 and a rear, right-side see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the augmented reality imagery. Light guide optical element 112 channels artificial light to the eye. Similarly, the left side of the HMD includes a front, left-side see-through lens 119 and a rear, left-side see-through lens 121.

Mounted to or inside temple 102 is an image source, which (in one embodiment) includes microdisplay 120 for projecting an augmented reality image and lens 122 for directing images from microdisplay 120 into light guide optical element 112. In one embodiment, lens 122 is a collimating lens. An augmented reality emitter can include microdisplay 120, one or more optical components such as the lens 122 and light guide 112, and associated electronics such as a driver. Such an augmented reality emitter is associated with the HMD device, and emits light to a user's eye, where the light represents augmented reality still or video images.

Figure 3A:
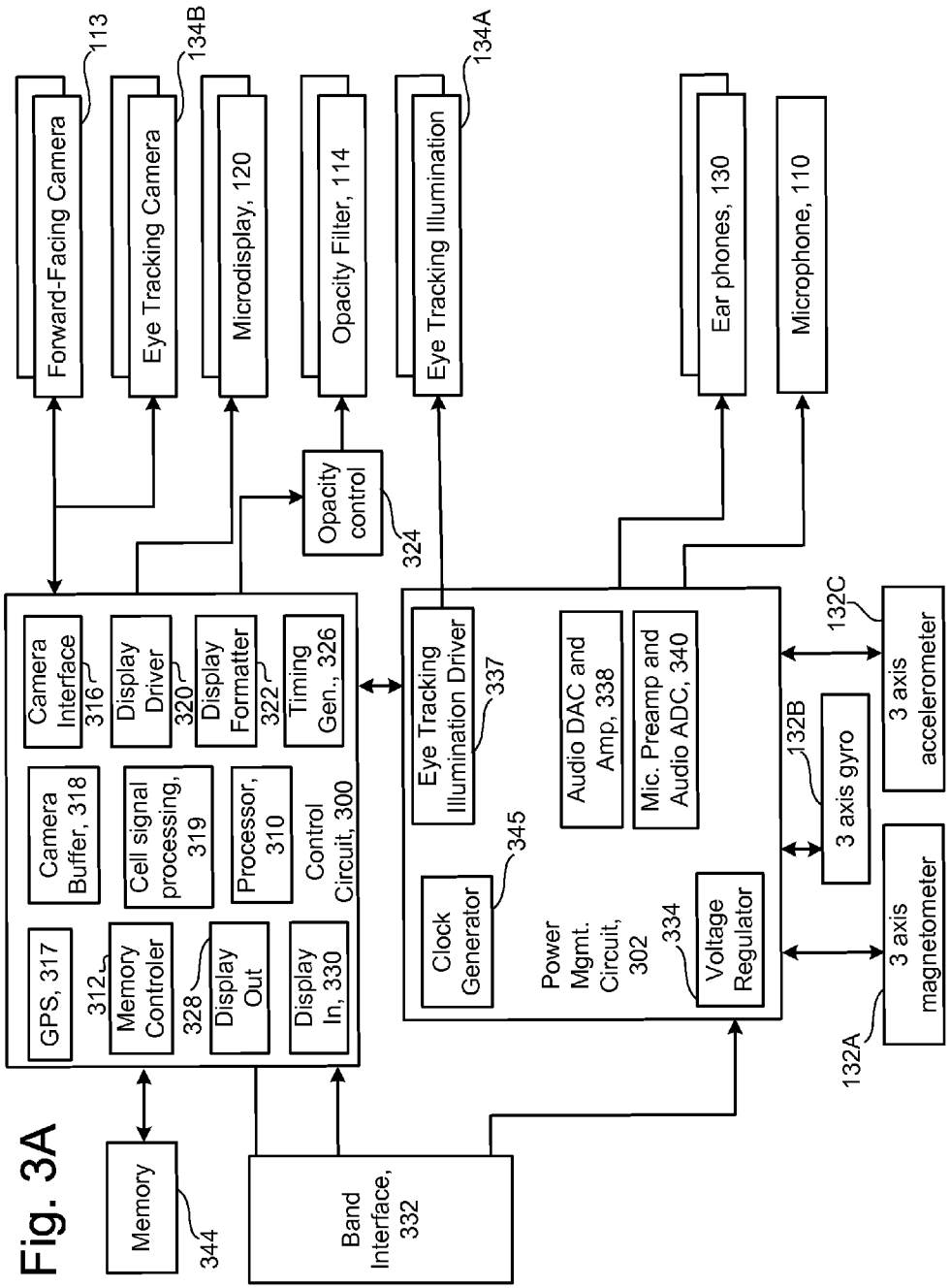
FIG. 3A is a block diagram of one embodiment of the components of an HMD device.

Control circuits 136, discussed further in connection with FIG. 3A, provide various electronics that support the other components of HMD device 2. Inside, or mounted to temple 102, are ear phones 130 and inertial sensors 132. In one embodiment, inertial sensors 132 include a three axis magnetometer 132A, three axis gyro 132B and three axis accelerometer 132C (see FIG. 3A). The inertial sensors are for sensing position, orientation, sudden accelerations of HMD device 2. For example, the inertial sensors can be one or more sensors which are used to determine an orientation and/or location of user's head. Movement of the head such as rotation, and an angular velocity of the rotation, can also be determined.

Microdisplay 120 projects an image through lens 122. Different image generation technologies can be used. For example, with a transmissive projection technology, the light source is modulated by optically active material, and backlit with white light. These technologies are usually implemented using LED type displays with powerful backlights and high optical energy densities. With a reflective technology, external light is reflected and modulated by an optically active material. The illumination is forward lit by either a white source or RGB source, depending on the technology.

Light guide optical element 112 transmits light from microdisplay 120 to the eye 140 of the user while allowing light from in front of the HMD device 2 to be transmitted through light guide optical element 112 to eye 140, as depicted by arrow 142, allowing the user to have an actual direct view of the space in front of HMD device 2, in addition to receiving an augmented reality image from microdisplay 120. Thus, the walls of light guide optical element 112 are see-through. Light guide optical element 112 includes a first reflecting surface 124 (e.g., a mirror or other surface). Light from microdisplay 120 passes through lens 122 and is incident on reflecting surface 124, which reflects the incident light such that light is trapped inside a planar, substrate comprising light guide optical element 112 by internal reflection. After several reflections off the surfaces of the substrate, the trapped light waves reach an array of selectively reflecting surfaces, including example surface 126.

Reflecting surfaces 126 couple the incident light waves out of the substrate into the eye 140 of the user. Different light rays will travel and bounce off the inside of the substrate at different angles as they hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device. A see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

FIG. 3A is a block diagram depicting the various components of HMD device 2. FIG. 4 is a block diagram describing the various components of processing unit 4 of FIG. 1. The HMD device components include many sensors that track various conditions. The HMD device will receive instructions about the augmented reality image from processing unit 4 and will provide the sensor information back to processing unit 4. Processing unit 4, the components of which are depicted in FIG. 4, will receive the sensory information of the HMD device 2. Optionally, the processing unit 4 also receives sensory information from hub computing device 12 (See FIG. 1). Based on that information, and/or other criterion as described herein, processing unit 4 will determine where and when to provide an augmented reality image to the user and send instructions accordingly to the HMD device.

Note that some of the components (e.g., forward-facing camera 113, eye tracking camera 134B, microdisplay 120, opacity filter 114, eye tracking illumination 134A and earphones 130) are shown in shadow to indicate that there are two of each of those devices, one for the left side and one for the right side of HMD device. Regarding the forward-facing camera 113, in one approach, one camera is used to obtain images using visible light. The eye tracking camera 134B and the eye tracking illumination 134A are part of an eye tracking component 134.

In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12.

Images from forward-facing cameras can be used to identify people, hand gestures and other objects in a field of view of the user. For example, it can be determined when the user makes a hand gesture such as pointing at an object. The real-world object can be identified and associated with a data stream, or used as the location to display a previously-associated data stream.

A control circuit 300 communicates with the power management circuit 302. Control circuit 300 includes processor 310, memory controller 312 in communication with memory 344 (e.g., DRAM), camera interface 316, camera buffer 318, display driver 320, display formatter 322, timing generator 326, display out interface 328, and display in interface 330. A GPS circuit 317 and/or a cell signal processing circuit 319 can be used to identify the location of the HMD device and the user. In one approach, the GPS circuit 317 and/or the cell signal processing circuit 319 process respective signals which are received by one or more antennas of the HMD device. In another approach, the HMD device receives location data from GPS and/or a cell signal processing circuits of other computing devices, such as a cell phone of the user or the hub computing device. The HMD device can also receive location-aware network data to determine location data, or receive location data which is determined by another computing device. A cell signal processing circuit determines location information using signals from one or more cell phone towers.

In one embodiment, all of components of control circuit 300 are in communication with each other via dedicated lines or one or more buses. In another embodiment, each of the components of control circuit 300 communicates with processor 310. Camera interface 316 provides an interface to the two forward-facing cameras 113 and stores images received from the forward-facing cameras in camera buffer 318. Display driver 320 drives microdisplay 120. Display formatter 322 provides information, about the augmented reality image being displayed on microdisplay 120, to opacity control circuit 324, which controls opacity filter 114. Timing generator 326 is used to provide timing data for the system. Display out interface 328 is a buffer for providing images from forward-facing cameras 112 to the processing unit 4. Display in interface 330 is a buffer for receiving images such as an augmented reality image to be displayed on microdisplay 120.

Display out interface 328 and display in interface 330 communicate with band interface 332 which is an interface to processing unit 4, when the processing unit is attached to the frame of the HMD device by a wire, or communicates by a wireless link, and is worn on the wrist of the user on a wrist band. This approach reduces the weight of the frame-carried components of the HMD device. In other approaches, as mentioned, the processing unit can be carried by the frame and a band interface is not used.

Power management circuit 302 includes voltage regulator 334, eye tracking illumination driver 337, audio DAC and amplifier 338, microphone preamplifier audio ADC 340 and clock generator 345. Voltage regulator 334 receives power from processing unit 4 via band interface 332 and provides that power to the other components of HMD device 2. Eye tracking illumination driver provides the infrared (IR) light source for eye tracking illumination 134A, as described above. Audio DAC and amplifier 338 receives the audio information from earphones 130. Microphone preamplifier and audio ADC 340 provides an interface for microphone 110. Power management unit 302 also provides power and receives data back from three-axis magnetometer 132A, three-axis gyroscope 132B and three axis accelerometer 132C.

FIG. 3B depicts an example embodiment of the microdisplay 120 of FIG. 3A. The microdisplay include an LED panel 336 and a power component 335. The LED panel may comprises OLEDs, for example, which have a low latency. OLEDs use a thin-film display technology in which organic compounds form the electroluminescent material. Further, pixels may be formed from one or more OLEDs. For example, one pixel may comprise red, blue and green subpixels formed from respective OLEDs. The pixels are arranged in a grid of rows and column. To display a frame of image data, the image data is loaded into the pixels one row at a time via columns as data signals. In this simplified example, columns are C1-C12 and rows are R1-R12. The panel power component 335 receives a PDC control signal to adjust the PDC as described herein. Further, a row select signal selects one of the rows for loading (e.g., writing) data. In one approach, a separate RDC control signal is provided for each row. Additional details regarding the PDC control signal and the RDC control signals are provided at FIGS. 5A-13. FIGS. 12A-12D provide details regarding example circuitry for the pixels.

Figure 13:
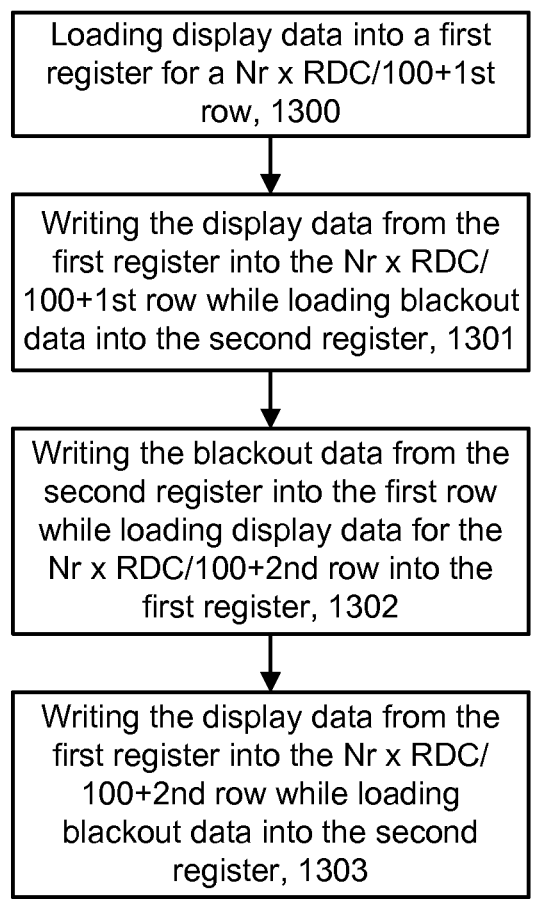
FIG. 13 depicts a process for using two shift registers to write display data and blackout data to a row, consistent with step 538 of FIG. 5D.

In one approach, the shift registers 341 and 342 store display data (data for setting a brightness level for a visible light emission from an LED) and blackout data (data for setting a black level for an LED such that there is no visible light emission) for blacking out a row at a specified time which is based on the row duty, as explained further below in step 538 of FIG. 5D and in FIG. 13.

FIG. 4 is a block diagram of one embodiment of the components of the processing unit 4 of FIG. 1. Control circuit 404 communicates with power management circuit 406. Control circuit 404 includes a central processing unit (CPU) 420, graphics processing unit (GPU) 422, cache 424, RAM 426, memory control 428 in communication with memory 430 (e.g., DRAM), flash memory controller 432 in communication with flash memory 434 (or other type of non-volatile storage), display out buffer 436 in communication with HMD device 2 via band interface 402 and band interface 332 (when used), display in buffer 438 in communication with HMD device 2 via band interface 402 and band interface 332 (when used), microphone interface 440 in communication with an external microphone connector 442 for connecting to a microphone, Peripheral Component Interconnect (PCI) express interface 444 for connecting to a wireless communication device 446, and USB port(s) 448.

In one embodiment, wireless communication component 446 can include a Wi-Fi® enabled communication device, BLUETOOTH® communication device, infrared communication device, etc. The wireless communication component 446 is a wireless communication interface which, in one implementation, receives data in synchronism with the content displayed by the audiovisual device 16. Further, augmented reality images may be displayed in response to the received data. In one approach, such data is received from the hub computing system 12, a local Wi-Fi® network or WLAN, a cell phone network, a local storage device or other source.

The USB port can be used to dock the processing unit 4 to hub computing device 12 to load data or software onto processing unit 4, as well as charge processing unit 4. In one embodiment, CPU 420 and GPU 422 are the main workhorses for determining where, when and how to insert augmented reality images into the view of the user.

Power management circuit 406 includes clock generator 460, analog to digital converter 462, battery charger 464, voltage regulator 466 and HMD power source 476. Analog to digital converter 462 is connected to a charging jack 470 for receiving an AC supply and creating a DC supply for the system. Voltage regulator 466 communicates with battery 468 for supplying power to the system. Battery charger 464 is used to charge battery 468 (via voltage regulator 466) upon receiving power from charging jack 470. HMD power source 476 provides power to the HMD device 2.

The calculations that determine where, how and when to insert an augmented reality image can be performed by the HMD device 2, and/or by a computing device which communicates with the HMD device.

In one example embodiment, the HMD device will create a model of the environment that the user is in and track various objects in that environment, based on the field of view of the HMD device. The model and the tracking information are provided to processing unit 4. Sensor information obtained by HMD device 2 is transmitted to processing unit 4. Processing unit 4 refines the field of view of the user and provide instructions to HMD device 2 on how, where and when to insert augmented reality images.

Figure 5A:
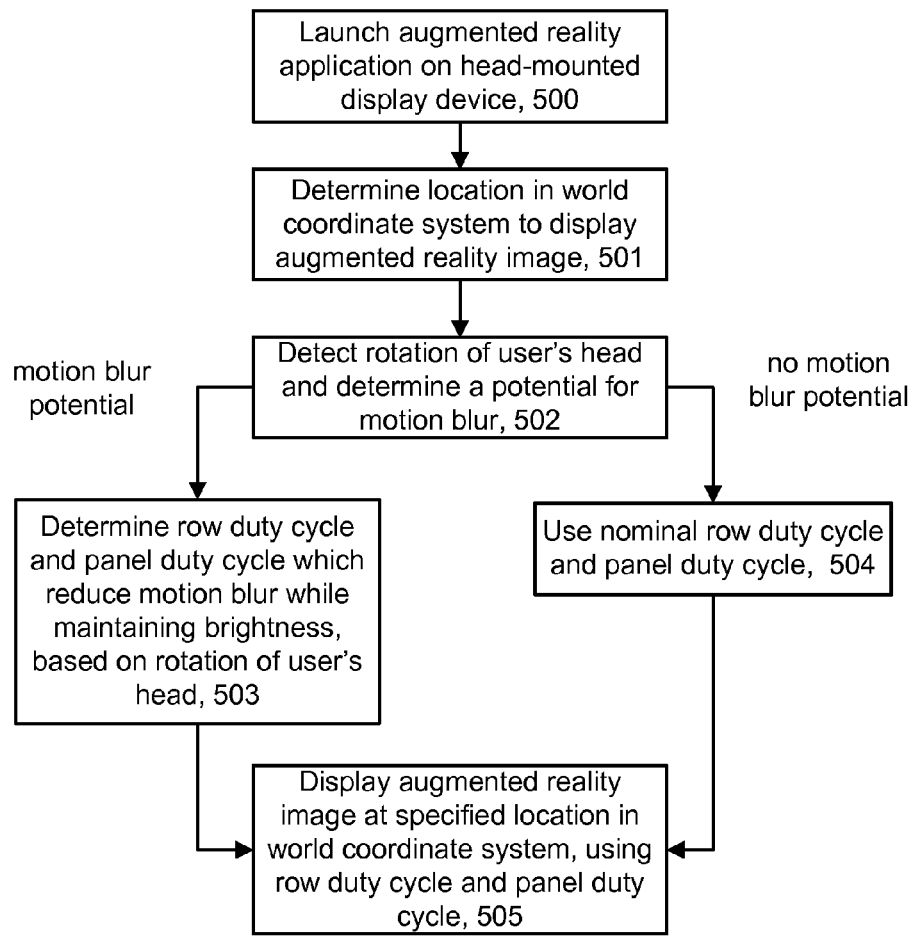
FIG. 5A depicts a process for providing an augmented reality image on a head-mounted display device while reducing motion blur.

FIG. 5A depicts a process for providing an augmented reality image on a head-mounted display device while reducing motion blur. At step 500, an augmented reality application is launched on the head-mounted display device. This can occur automatically or in response to a user command, for instance. Step 501 determines a location in a world coordinate system to display an augmented reality image. See, e.g., FIGS. 6A-6C for further details. Step 502 detects a rotation of a user's head and determines a potential for motion blur. See, e.g., FIG. 5B for further details. This determination can be made once per frame period, in one approach. For example, at a frame rate of 60 Hz, the frame period is 16 milliseconds. If there is a significant potential for motion blur, step 503 determines a RDC and a PDC which reduce motion blur while maintaining brightness, based on the rotation of the user's head. If there is not a significant potential for motion blur, step 504 uses a nominal RDC and PDC. The nominal duty cycles can be duty cycles which are not adjusted to reduce motion blur. These duty cycles can be fixed or can vary over one or more frame periods. For example, the nominal row and/or PDC may be increased to provide a greater overall brightness level when the user walks outside into a sunlit environment. The increased brightness can help maintain the visibility of the augmented reality image. Subsequently, step 505 displays the augmented reality image positioned at a specified location in a world coordinate system, using the appropriate RDC and PDC.

One option is to determine the RDC and PDC once per frame at the start of the frame and to use the same RDC for each row. However, other options are possible. For example, the RDC and PDC can be determined more than once per frame, or less than once per frame. Further, different RDCs can be used for different rows. In some cases, blackout data, or no data, may be loaded into one or more rows, in which case these rows can have a 0% duty cycle. Different RDCs can be used for different subpixels of a pixel. Further, it is possible to use a varying frame rate.

Figure 5B:
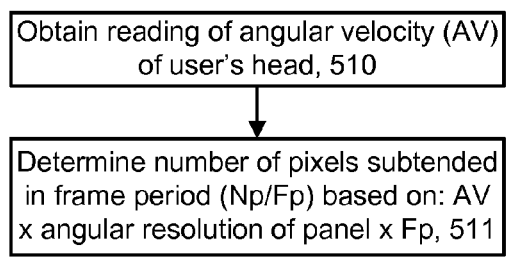
FIG. 5B depicts example details of step 502 of FIG. 5A for detecting a rotation of a user's head and a potential for motion blur.

FIG. 5B depicts example details of step 502 of FIG. 5A for detecting a rotation of a user's head and a potential for motion blur. As mentioned in connection with FIG. 3A, an inertial sensor such as a magnetometer, accelerometer or gyroscope can be carried by the HMD device and used to sense movement such as rotation of a user's head. In one approach, the rotation is detected in a local coordinate system of the HMD device. Step 510 involves obtaining a reading of angular velocity (AV) of the user's head from the sensor. In some cases, the sensor itself may provide the reading. In other cases, the sensor provides information to an external processor which processes the information to provide the reading. The reading can be obtained once per frame, in one approach. In another possible approach, multiple readings per frame are obtained and a most current reading is used.

Generally, an angular velocity component in a direction of the rows of the LED panel is of interest. For example, assuming the rows are horizontal, the angular velocity component can be an azimuthal rotation (degrees) per unit of time in the xh-zh plane of the local coordinate system as depicted in FIG. 6D. Step 511 determines a rate by which pixels in the auxiliary reality image are subtended by the rotation of the user's head at a certain angular velocity. This rate can be expressed in terms of a number of pixels (Np) subtended per unit time such as a frame period (Fp), e.g., Np/Fp=AV×angular resolution of panel×Fp. The number of pixels subtended in a time period is a measure of the blurring.

The angular resolution of the panel, or pixel density, in pixels/per degree, is a function of the number of pixels in the panel and the extent of the field of view. An example is 10-30 pixels/degree. The angular resolution can be defined as the angular subtense of each pixel which is estimated by dividing the field of view in any direction by a corresponding number of pixels in that direction. An example angular velocity is 100-300 degrees/sec. The angular velocity or Np/Fp, as proxies of one another, can be used to determine a RDC and a PDC. See also FIGS. 6D and 7A for further details.

FIG. 5C depicts example details of step 503 of FIG. 5A for determining RDC and PDC which reduce motion blur while maintaining brightness. A decision step 520 determines if Np/Fp is greater than a threshold level. For example, see FIGS. 8A and 8B. If decision step 520 is true, step 521 determines RDC and PDC for the frame based on Np/Fp. If decision step 522 is false, step 522 uses a nominal RDC and PDC for the frame. For example, see FIG. 7B.

FIG. 5D depicts example details of step 505 of FIG. 5A for displaying an augmented reality image locked to a location in a world coordinate system, using a determined RDC and PDC. A frame period begins at step 529. Step 530 activates a PDC control signal. Step 531 sets a row index=1 to denote the first row in the panel. Step 532 begins a row period for the ith row. A row period is a period between a time in which one row is addressed and a time in which the next row is addressed, and is dedicated to a row to perform functions such as resetting the row and then writing display data into the pixels of the row (step 533). The resetting involves grounding the capacitor to ensure it holds no charge.

The writing involves setting a charge level of a capacitor (a charge storing element) according to a desired bright level for each LED. As explained further in connection with FIGS. 12A-12D, the charge may be applied to a control gate of a transistor which controls an amount of power from a power supply which reaches the LED. A greater charge results in more power reaching the LED and therefore a greater brightness. The reset and writing can be timed with respect to the PDC control signal.

Step 534 sets a RDC control signal to an associated on level for the row. The RDC control signal and the PDC control signal together control when the pixels of the row can emit light.

Once the data has been loaded into a row, the next row can be selected. At decision step 535, if there is a next row in the frame to address, the row index i is incremented at step 536 and the row period begins for the next row at step 532. If the current row is the last row in the frame, then a next frame begins at step 529.

Figure 9A:
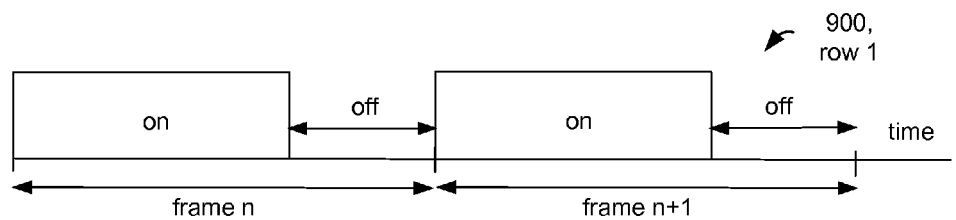
FIGS. 9A to 9D depict a common timeline showing 70% RDC control signal for a first, second, Nr×RDC/100+1$^{st}$, and last row, respectively, of a panel.

Also, after step 534, step 537 is performed at an appropriate time. This step involves setting the RDC control signal to the associated off level for the ith row. In response, one of a number of options can be selected for preventing further light emission from the LEDs of the row in a frame period. One option, at step 538 is to reset and write blackout data to the ith row directly after resetting and writing display data to a next row (the next row to be written with display data following the appropriate time of step 537). See FIGS. 9A and 9C for further details, where FIG. 9A represents the ith row and FIG. 9C represents the next row to be written with display data following the appropriate time. Another option, at step 539, is to discharge capacitors in the ith row using a panel-level transistor, as discussed further at FIG. 12A (see transistor T5). Another option, at step 540, is to discharge capacitors in the ith row using LED-level transistors, as discussed further at FIG. 12B (see transistor T6). Another option, at step 541, is to terminate power to the LEDs in the ith row using a row-level transistor, as discussed further at FIG. 12C (see transistor T7). Another option, at step 542, is to terminate power to the LEDs in the ith row using LED-level transistors, as discussed further at FIG. 12D (see transistor T8). Other implementations are possible as well.

Figure 6A:
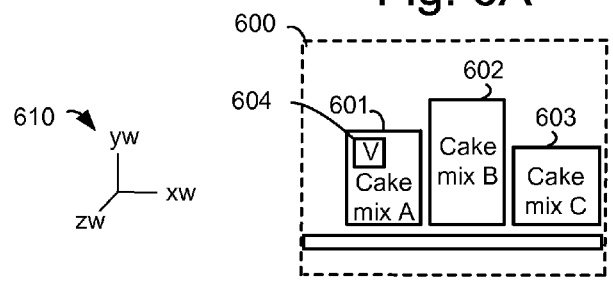
FIG. 6A depicts an example real world image at a fixed location in a world coordinate system.

FIG. 6A depicts an example real world image at a fixed location in a world coordinate system. A region 600 represents real-world objects in a field of view of the front-facing camera of an HMD device. As an example, the HMD device may run an application in which food items 601, 602 and 603 (boxes of cake mix) are identified such as on a shelf in a grocery store. The application recognizes the food items and determines one or more food items to recommend to the user based on preferences of the user and matching characteristics of the food item. For example, the user may prefer vegan food.

The foods item 601 is recognized as being vegan due to the "V" (logo 604) on the container. The application therefore recommends this food item and highlights its location to the user by providing an augmented reality image 605 in the form of a frame around the item, as depicted in FIG. 6B.

Figure 6B:
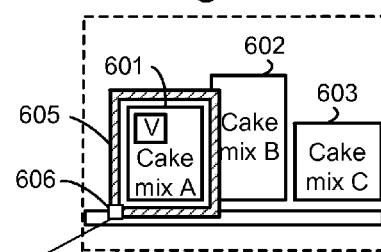
FIG. 6B depicts a scenario in which a user views an augmented reality image as a frame around the box in FIG. 6A.

FIG. 6B depicts a scenario in which a user views an augmented reality image as a frame around the box in FIG. 6A. The augmented reality image can be locked to the real-world location of the food item 601 in the world coordinate system 611, so that the frame continues to appear in place around the food item 601 even as the user moves their head while continuing to look at the food item in their field of view. The world coordinate system has axes labeled as xw, yw and zw. An example pixel 606 is part of the augmented reality image 605. The user is depicted wearing the HMD device 2 on their head 610 and viewing the pixel 606 via a line of sight 612. The HMD device has a local coordinate system 611 with axes labeled as x, y and z.

Figure 6C:
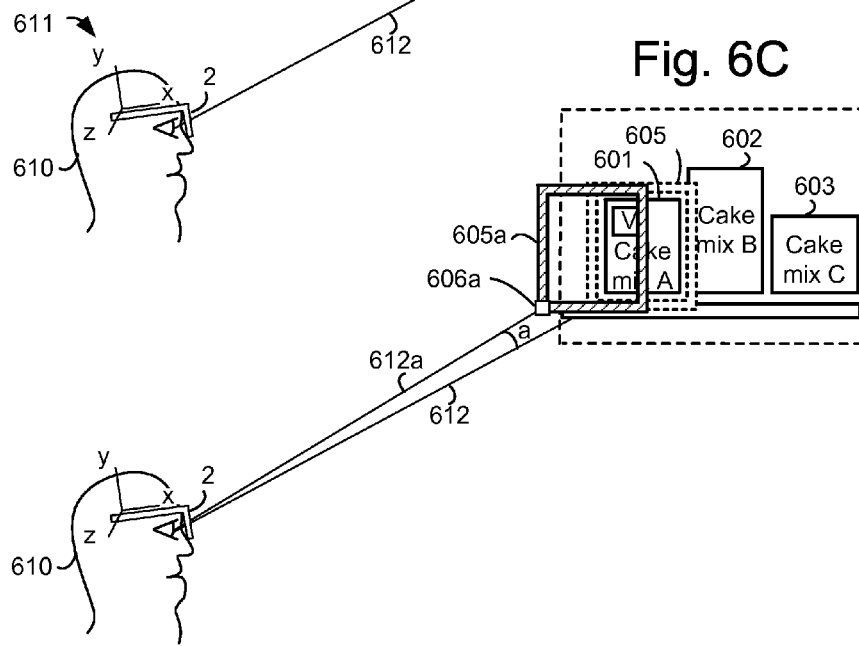
FIG. 6C depicts a scenario in which the user's head rotates, resulting in the potential for motion blur of the augmented reality image.
Figure 6D:
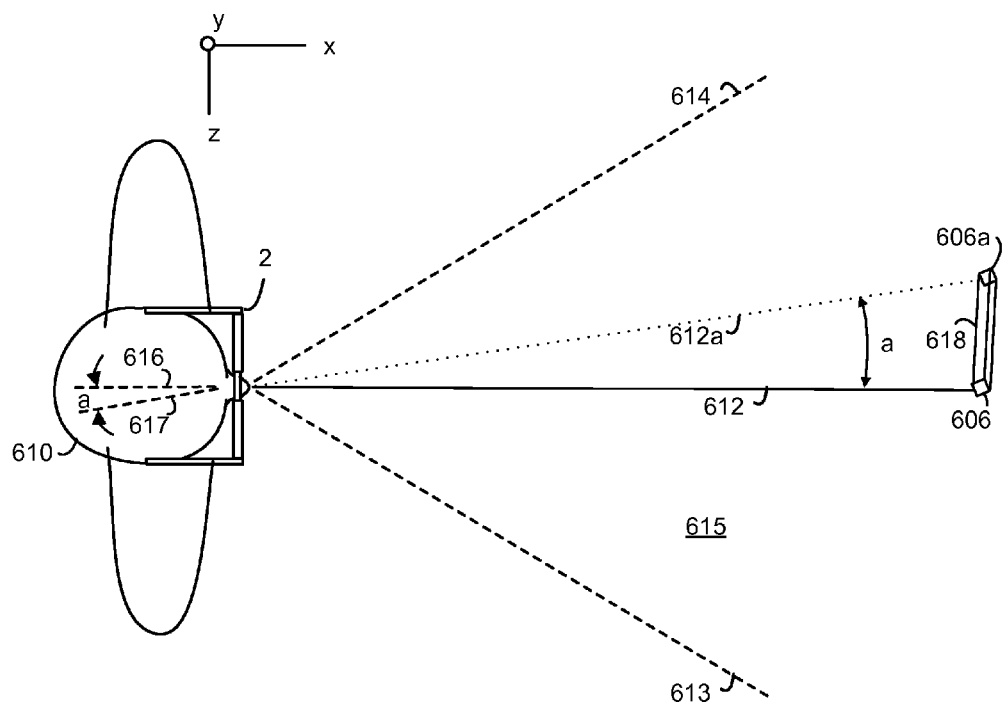
FIG. 6D depicts a top view of the scenario of FIG. 6C showing a perceived movement of an example pixel.

FIG. 6C depicts a scenario in which the user's head rotates, resulting in the potential for motion blur of the augmented reality image. The augmented reality image appears to be at a location in the real world which is shifted by an angle "a." This shift is represented by a perceived movement of the augmented reality image 605 including the pixel 606 in the line of sight 612 to the augmented reality image 605a including the pixel 606a in the line of sight 612a. This results in a perceived blurring of the augmented reality image, reducing the quality of the experience for the user. When a next frame of the augmented reality image is displayed, the location of the image will change in the local coordinate system because the pixels used to represent the augmented reality image will change. However, the location of the image will be fixed in the world coordinate system because the pixels used to represent the augmented reality image are meant to be in a fixed location around the food item 601, in one approach. The blurring of each frame of the augmented reality image may continue as the user's head continues to move.

FIG. 6D depicts a top view of the scenario of FIG. 6C showing a perceived movement of an example pixel. A field of view 615 of the augmented reality image is between boundary lines 613 and 614. The user's head 610 rotates by the angle "a" as indicated by a change of a central axis of the user's head from a position 616 to a position 617. The angular velocity is a/t, where "t" is the time of the movement. This example shows a relatively small movement which occurs over one frame period, but the movement can continue beyond one frame period, as mentioned. A region 618 represents a number of pixels which are subtended in the frame period. This corresponds to the amount of motion blur.

FIG. 7A depicts an example graph showing a head rotation as a function of time. The x-axis depicts time and the y-axis depicts a magnitude of angular velocity (AV) or, equivalently, a number of pixels subtended per frame period. Th is a threshold and L1 and L2 are respective magnitudes. The threshold is exceed between t1 and t2 and between t3 and t4, thereby triggering an adjustment of the RDC and the PDC, such as depicted in FIG. 7B. Th can be zero or greater. If Th is greater than zero, small head rotation rates which are less than Th can be ignored.

FIG. 7B depicts an example graph showing adjustments in a RDC and a PDC as a function of time, according to the head rotation of FIG. 7A. The x-axis depicts time and the y-axis depicts duty cycle. The time axis is the same in FIGS. 7A-7C. Plot 702 (solid line) depicts RDC and plot 703 (dashed line) depicts PDC. In this example, the RDC is at a nominal level of 100% and the PDC is at a nominal level of 30%. To achieve a substantially constant brightness as depicted in FIG. 7C, a condition can be set that RDC (%)×PDC (%)=constant. The constant may be: nominal RDC (%)×nominal PDC (%)=3000. In other words, the LEDs emit light for substantially 30% of a frame period. The RDC is decreased to 30% between t1 and t2 and to 70% between t3 and t4. In concert with the setting of the RDC to reduce motion blur, the PDC is increased to 100% (3000/30) between t1 and t2 and to 43% (3000/70) between t3 and t4 to maintain brightness. Thus, there is a concurrent decrease of the RDC of the rows and an increase of the PDC of the LED panel. Further, the RDC is decreased and the PDC is increased in proportion to the angular velocity. As mentioned, the angular velocity is in an azimuthal direction with respect to a coordinate system of the head-mounted display device.

Note that the RDC control signal may be inactive for short intervals in which resetting and writing occur (see steps 533 and 534 of FIG. 5D). Accordingly, an RDC of 100% may represent the RDC control signal being at the on level for 100% of the time that the RDC control signal is active and this can less slightly less than a full frame period.

A process according to these figures includes controlling a panel of LEDs arranged in rows to display an augmented reality image, where the controlling comprises setting a RDC of the rows at an associated initial level (e.g., 100%) and setting a PDC of the panel at an associated initial level (e.g., 30%). The process include determining that a user's head is rotating during a time period and, during the time period, setting the RDC at a lower level (e.g., 30% or 70%) than the associated initial level of the rows and setting the panel duty cycle to a higher level (e.g., 100% or 43%) than the associated initial level of the panel. The process further includes, after the time period, setting the RDC back to the associated initial level of the rows and setting the PDC back to the associated initial level of the panel.

FIG. 7C depicts an example graph showing a brightness level of an LED panel as a function of time, according to the RDC and PDC of FIG. 7B. The decrease in the RDC can be offset by the increase in the PDC so that the time in which the light-emitting diode is emitting light and, therefore, a brightness level of the panel, is substantially constant (e.g., within +/−10% of a nominal brightness level), during a frame period of the augmented reality image. This is desirable because it avoids a perception of a reduced brightness by the user compared to the case of reducing RDC without changing PDC. The brightness is a function of the total time each pixel is illuminated in a frame period. Although the decrease in RDC alone would result in a reduction in the total illumination time, this decrease is offset by an increase in the PDC, so that each illumination pulse is longer. See FIGS. 10A-11C for example details.

FIG. 8A depicts an example graph for setting RDC and PDC based on head rotation. This can be implemented in the control logic of a processor, for instance. One x-axis depicts Np/Fp and another x-axis depicts AV. The y-axis depicts duty cycle. The solid line and the triangle data points (plot 704) depict the RDC while the dashed line and the square data points (plot 706) depict the PDC. When Np/Fp is less than a lower threshold such as two pixels, no change is made in the duty cycles. When Np/Fp is between the lower threshold and an upper threshold, e.g., twelve pixels, the duty cycles are changed progressively and proportionately. When Np/Fp exceeds the upper threshold, no further change is made in the duty cycles. For practical reasons, the duty cycles should be within respective upper and lower limits. In this example, the RDCs ranges between 30-100% and the PDCs also ranges between 30-100%. Similarly, when AV is less than a lower threshold (AV1), no change is made in the duty cycles. When AV is between the lower threshold and an upper threshold (AV2), the duty cycles are changed progressively and proportionately. When AV exceeds the upper threshold, no further change is made in the duty cycles.

FIG. 8B depicts an example graph which is an alternative to FIG. 8A, where discrete levels of the RDC and the PDC are provided. To simplify the implementation, the number of levels of duty cycles which are used can be limited to a few discrete levels, so that a range of values of Np/Fp or AV is associated with one of the discrete values for RDC (solid lines) and a corresponding one of the discrete values for PDC (dashed lines). For example, Np/Fp less than two pixels is associated with 100%/30% (row/panel) duty cycles, Np/Fp between 2-4 pixels is associated with 85%/35% (row/panel) duty cycles, Np/Fp between 4-6 pixels is associated with 73%/41% (row/panel) duty cycles, Np/Fp between 6-8 pixels is associated with 60%/50% (row/panel) duty cycles, Np/Fp between 8-10 pixels is associated with 45%/67% (row/panel) duty cycles, and Np/Fp above 10 pixels is associated with 30%/100% (row/panel) duty cycles.

FIG. 9A depicts a timeline 900 showing a 70% RDC control signal (RDCcc) for a first row of a panel. At a start of a frame n, a reset operation can be performed to ensure that the capacitors of the LEDs in the row are discharged. A write operation is then performed to load data into each of the pixels of the row. This can involve setting a new charge on the capacitors according to a desired brightness level of the pixels. RDCcc is at an associated on level for the first 70% of frame n and at an associated off level for the remaining 30% of frame period n. This control signal being at the associated on level indicates that the pixels in the row are permitted to, but do not necessarily, emit light. The pixels will emit light if the PDC control signal is also at the associated on level (and the data written into the LED indicates it should emit light). In one option, the reset is performed additionally or alternatively when the respective RDCcc transitions from the associated on level to the associated off level. This approach is desirable because it does not involve an additional transistor for each LED. In other approaches, there is an additional transistor for each LED for preventing further illumination from the row.

In one example, there is a frame rate of 60 Hz and the frame period is 16 milliseconds. As a simplified example, assume that there are one thousand rows. Thus, each row period is 16 microseconds. The RDC can be defined as the percentage of a full frame time that any specific scan line in the display will illuminate its assigned value. This is a value that could be specified between 0-100%. A RDC of 70% by itself would cause each row to remain illuminated for 11.2 milliseconds following the writing of data in the row. This is on the time scale of the full frame. Controlling this value allows for the limiting of motion blur. Specifying a value below 100% will in effect insert a black frame between consecutive frames of content.

Further, panel PWM duty cycle can be defined as the percentage of each row period during which the full panel is illuminated. This could be specified as a value of 0-100%. A PDC of 100% by itself would mean that during each line time, the panel is illuminated for the full 16 microseconds. A PDC of 30% by itself would mean that during each line time, the panel is illuminated for 4.8 microseconds.

While manipulating RDC or panel duty cycle independently will result in observable brightness changes, controlling them in concert allows for adjustment of RDC (effectively controlling motion blur) while maintaining a constant brightness. In addition to reducing motion blur, there is a potential to optimize for panel lifetime when in low motion scenarios, increasing the RDC and reducing the PDC to burst the display.

The reset and writing of a row is completed in less than a row period, and typically in a small fraction of a row period, so that the next row can be addressed without delay. Once the capacitor of an LED is charged, it can remain charged for one frame period, in one approach, or at least as long as the RDC control signal is at the associated on level.

Figure 9B:
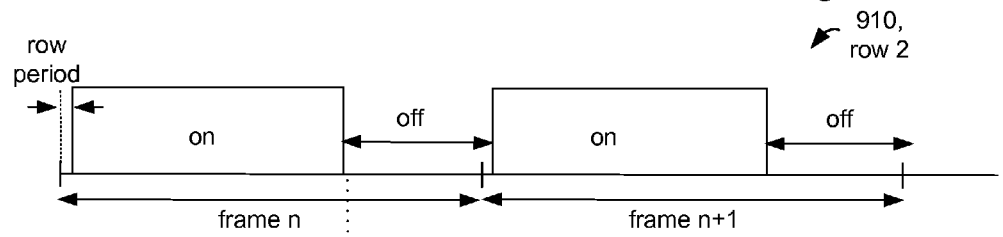
Figure 9C:
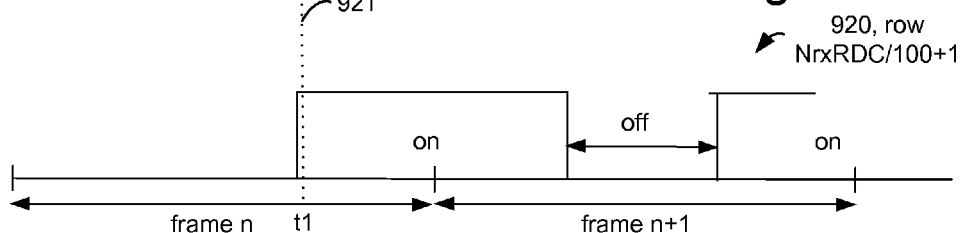

FIG. 9B depicts a timeline 910 showing a 70% RDC control signal for a second row of a panel. After a delay of a row period compared to the start of the on period for the RDC control signal for row 1, the RDC control signal for row 2 is set to the on level. The RDC control signal for row 2 is set to the off level one row period after the RDC control signal for row 1 is set to the off level and remains at the off level until one row period after the start of a next frame, frame n+1.

FIG. 9C depicts a timeline 920 showing a 70% RDC control signal for a row with an index of Nr×RDC/100+1, where Nr is a number of rows in a frame. After a delay of Nr×RDC/100 row periods compared to the start of the on period for the RDC control signal for row 1, the RDC control signal for this row is set to the on level. The RDC control signal for this row is set to the off level subsequently partway through frame n+1, and back to the on level again one row period later.

Consistent with step 538 of FIG. 5D, the on-off transition for RDCcc in row 1 can involve a reset and write of blackout data to row 1 which is triggered by the completion of a reset and write of display data in row Nr×RDC/100+1 at time t1 as represented by line 921. Essentially, t is the "appropriate time" referred to in step 537 to set the RDCcc to the associated off level for the i=1st row. Row Nr×RDC/100+1 is selected Nr×RDC/100 rows after the first row. For example, with Nr=1000 and RDC=70%, the row index for FIG. 9C is i=701 and this is 700 rows after the first row. Continuing this pattern, the on-off transition for RDCcc in row 2 can involve a reset and write of blackout data to row 2, triggered by the completion of a reset and write of display data in row Nr×RDC/100+2. The process continues accordingly. This approach is advantageous because additional hardware is not used. Instead, control logic can be configured to perform the additional reset and write of the blackout data in each row. Thus, in one row period, each row is reset and written with display data and subsequently reset and written with blackout data partway through the row period. This applies when RDC<100%.

Two shift registers can be used, where display data is initially stored in one register (e.g., 341) and blackout data is stored in the other register (e.g., 342). For example, FIG. 13 depicts a process for using two shift registers to write display data and blackout data to a row, consistent with step 538 of FIG. 5D. Step 1300 include loading display data into a first register for a Nr×RDC/100+1st row. Step 1301 includes writing the display data from the first register into the Nr×RDC/100+1st row while loading blackout data into the second register. Step 1302 includes writing the blackout data from the second register into the first row while loading display data for the Nr×RDC/100+2nd row into the first register. Step 1303 includes writing the display data from the first register into the Nr×RDC/100+2nd row while loading blackout data into the second register. The process proceeds accordingly. For a first frame in which RDC<100%, blackout data will not be written until the Nr×RDC/100+1st row is reached, in one approach.

Figure 9D:
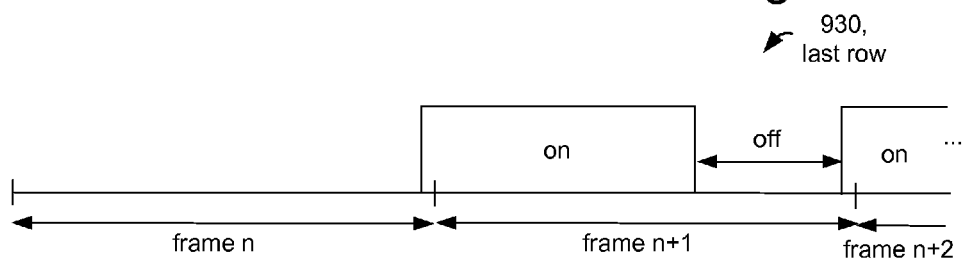

FIG. 9D depicts a timeline 930 showing a 70% RDC control signal for a last row of a panel. After a delay of, e.g., 999 row periods (assuming 1000 rows) compared to the start of the on period for the RDC control signal for row 1, and one row period before the end of frame n, the RDC control signal for the last row (row 1000) is set to the on level. The RDC control signal for row 1000 is set to the off level subsequently partway through frame n+1, and back to the on level one row period before the start of frame n+2.

Figure 10A:
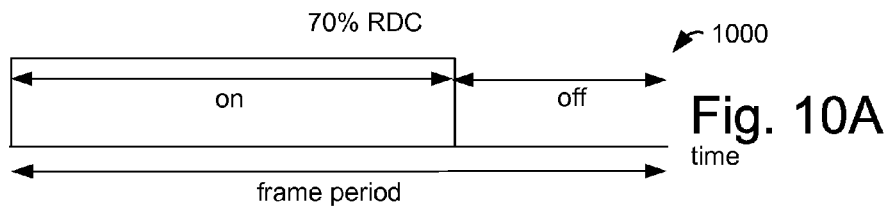
FIG. 10C depicts a light output of a row as a function of time, when there is a 70% RDC control signal as depicted in FIG. 10A and a 43% PDC control signal as depicted in FIG. 10B.
Figure 10B:
Figure 10C:
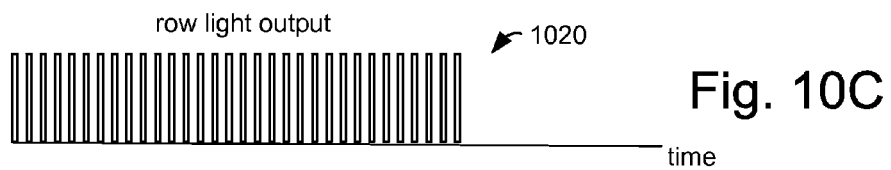

FIG. 10C depicts a light output 1020 of a row as a function of time, when there is a 70% RDC control signal 1000 as depicted in FIG. 10A and a 43% PDC control signal 1010 as depicted in FIG. 10B. In this example, the LEDs emit light for 70%×43%=30% of the frame period.

Figure 11A:
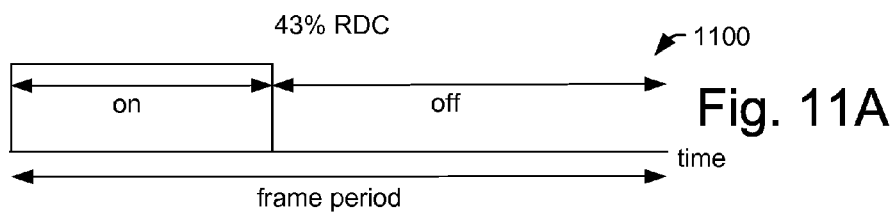
FIG. 11C depicts a light output of a row as a function of time, when there is a 43% RDC control signal as depicted in FIG. 11A and a 70% PDC control signal as depicted in FIG. 11B.
Figure 11B:
Figure 11C:
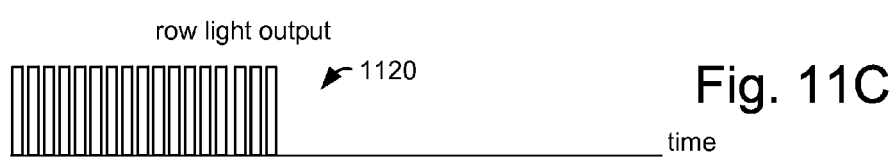

FIG. 11C depicts a light output 1320 of a row as a function of time, when there is a 43% RDC control signal 1300 as depicted in FIG. 11A and a 70% PDC control signal 1310 as depicted in FIG. 11B. In this example, the LEDs again emit light for 43%×70%=30% of the frame period.

Figure 12A:
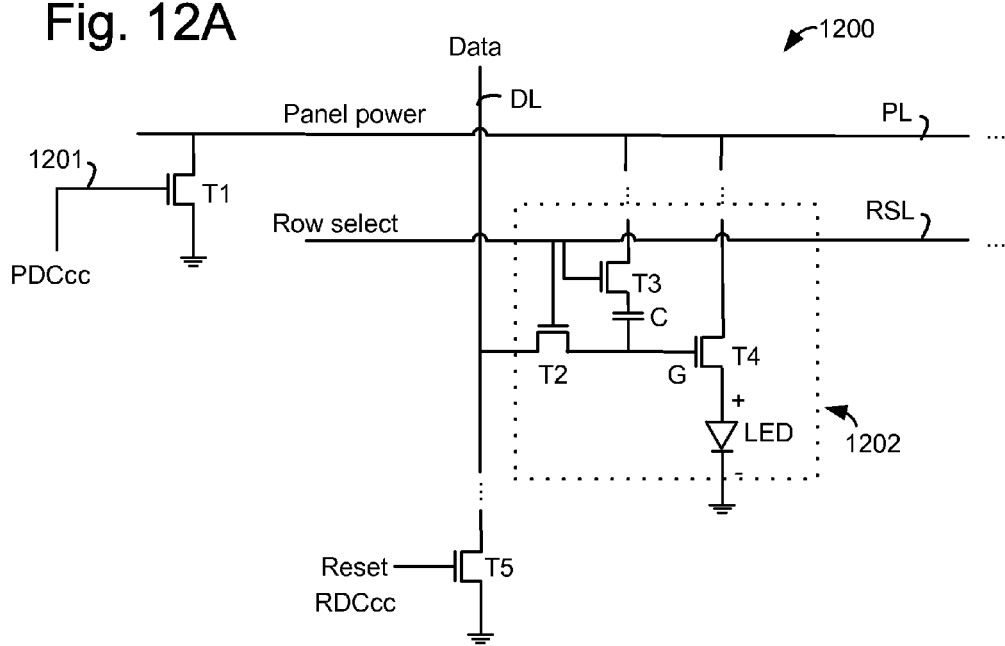
FIG. 12A depicts an example embodiment of the LED panel 336 of FIG. 3B corresponding to step 539 in FIG. 5D where capacitors are discharged in an ith row using a column-level transistor T5.

FIG. 12A depicts an example embodiment of the LED panel 336 of FIG. 3B corresponding to step 539 in FIG. 5D where capacitors are discharged in an ith row using a column-level reset transistor T5. The panel circuit 1200 includes a circuit 1202 for each LED. Each circuit 1202 includes an LED having a cathode (−) and anode (+). The cathode is grounded and the anode is connected to a transistor T4. A gate G of T4 has a voltage which is set according to a charge on a capacitor C. The brightness of the LED is controlled by this charge because the charge controls the degree of conductivity of T4. If T4 is relatively more conductive, it allows relatively more current from a power line (PL) to reach the LED. When a row select line (RSL) is high, transistors T2 and T3 are conductive, so that the capacitor is charged according to a data signal on a data line (DL), in the writing process. The panel power can be turned on and off according to the PDC control signal (PDCcc) which is applied to the gate of a transistor T1 via a line 1201. When PDCcc is high, T1 is conductive and the power line is grounded so there is no light output for the panel. When PDCcc is low, T1 is non-conductive and the power line is not grounded so there can be a light output for a row when the RDC control signal is also high.

A transistor T5 is connected to each data line. The capacitor C can be discharged when the RDC control signal is high (making T5 conductive) and the row select signal is high (making T2 conductive). In one approach, this discharge occurs partway through a row period, when the row duty cycle control signal transitions from high to low (on to off). The line PL communicates with each LED in the panel, the line RSL communicates with each LED in a row, and the line DL communicates with each LED in a column, in one approach.

In this case, each light-emitting diode comprises a capacitor which is charged to a desired level according to a desired brightness of the light-emitting diode. Further, the capacitor is in a charged state when the respective RDC control signal is at the associated on level and is reset to a discharged state when the respective RDC control signal transitions to the associated off level.

The circuit 1200 can also be used for the implementation of step 538 of FIG. 5D, where, after resetting and then writing display data to a next row, the control writes blackout data to the ith row. RDCcc is used within the control logic and not necessarily applied as a signal to the panel. The writing of blackout data to an LED is essentially resetting of the LED to provide the capacitor of the LED in a discharged state.

Figure 12B:
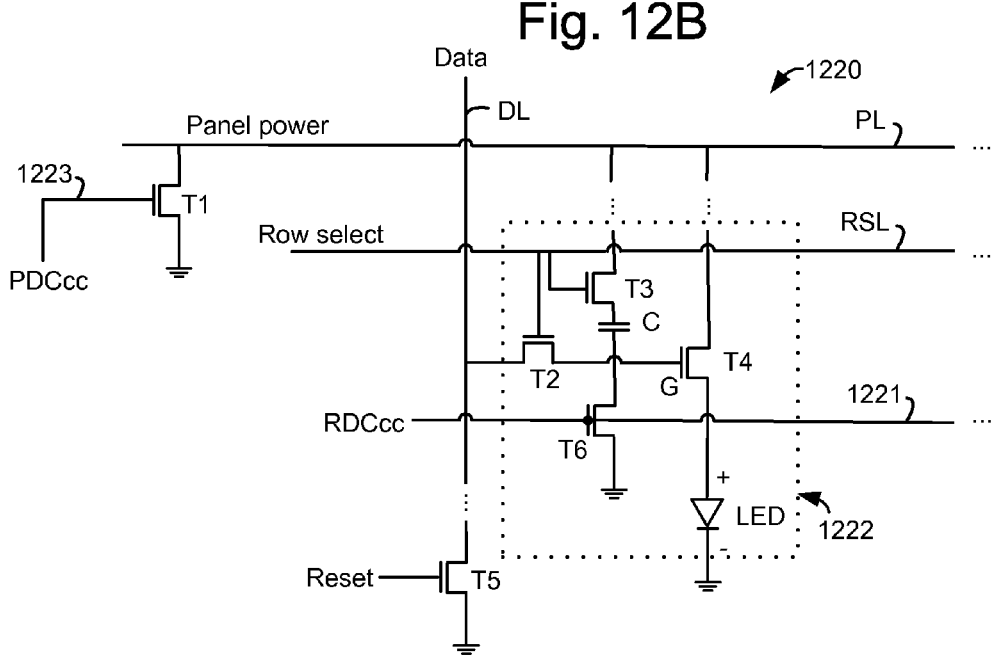
FIG. 12B depicts an example embodiment of the LED panel 336 of FIG. 3B corresponding to step 540 in FIG. 5D where capacitors are discharged in an ith row using a LED-level transistor T6.

FIG. 12B depicts an example embodiment of the LED panel 336 of FIG. 3B corresponding to step 540 in FIG. 5D where capacitors are discharged in an ith row using a LED-level transistor T6. The panel circuit 1220 includes a circuit 1222 for each LED. Each circuit 1222 includes an LED, where the cathode is grounded and the anode is connected to a transistor T4. A gate G of T4 has a voltage which is set according to a charge on a capacitor C. When a row select line (RSL) is high, transistors T2 and T3 are conductive, so that the capacitor is charged according to a data signal on a data line (DL), in the writing process.

Further, T6 can connect the capacitor to ground. A line 1221 is connected to a gate of T6 in each LED of the row so that T6 is non-conductive when the RDC control signal is high. T6 is conductive when the RDC control signal is low, discharging the capacitor so that the LED cannot receive power from the power line via T4. For example, T6 can be a depletion mode MOSFETs while the other transistors are enhancement mode MOSFETs.

As discussed in connection with FIG. 12A, the panel power can be turned on and off according to PDCcc which is applied to the gate of a transistor T1 via a line 1223. A transistor T5 is connected to each data line and can provide an alternative discharge path for the capacitors.

Figure 12C:
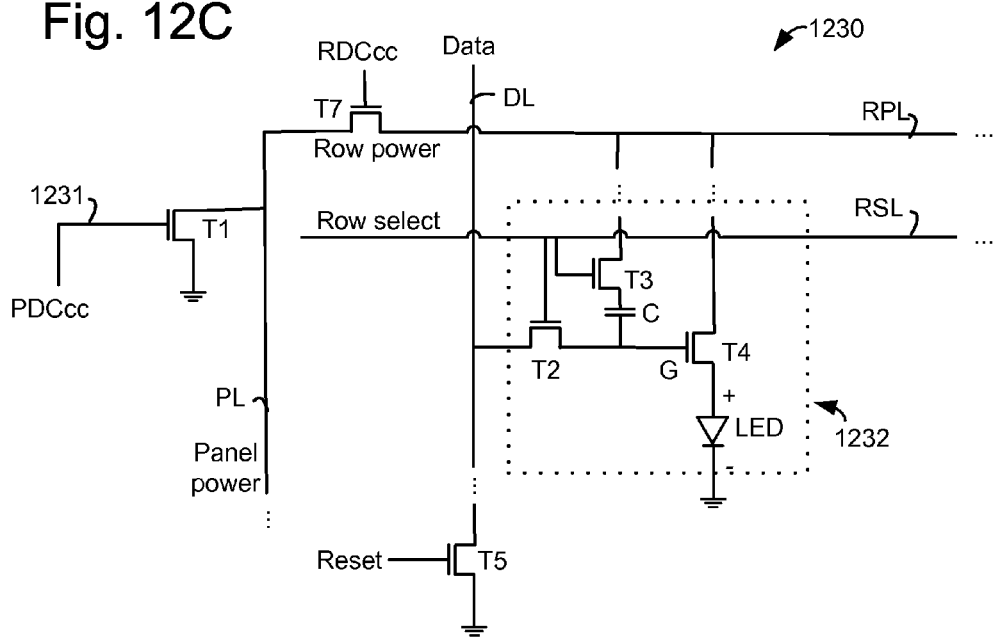
FIG. 12C depicts an example embodiment of the LED panel 336 of FIG. 3B corresponding to step 541 in FIG. 5D where power to the LEDs is terminated using a row-level transistor T7.

FIG. 12C depicts an example embodiment of the LED panel 336 of FIG. 3B corresponding to step 541 in FIG. 5D where power to the LEDs is terminated using a row-level transistor T7. The panel circuit 1230 includes a circuit 1232 for each LED and is similar to the circuit 1202 of FIG. 12A. In this case, there is a separate row power line (RPL) for each row, branching off of the power panel line (PL). T7, controlled by RDCcc, connects PL to RPL when RDCcc is at the associated on level, and does not connect PL to RPL when RDCcc is at the associated off level.

Figure 12D:
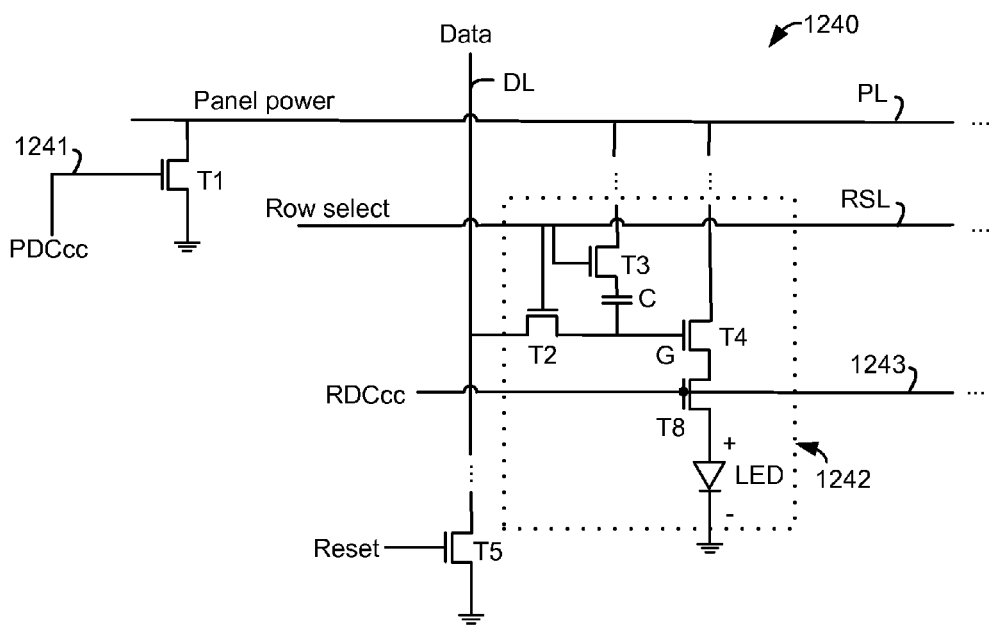
FIG. 12D depicts an example embodiment of the LED panel 336 of FIG. 3B corresponding to step 542 in FIG. 5D where power to the LEDs is terminated using LED-level transistors T8.

FIG. 12D depicts an example embodiment of the LED panel 336 of FIG. 3B corresponding to step 542 in FIG. 5D where power to the LEDs is terminated using LED-level transistors T8. The panel circuit 1240 includes a circuit 1242 for each LED. Each circuit 1242 includes an LED where the cathode is grounded and the anode is connected to a transistor T8. T8 is connected to a transistor T4. A gate G of T4 has a voltage which is set according to a charge on a capacitor C. When a row select line (RSL) is high, transistors T2 and T3 are conductive, so that the capacitor is charged according to a data signal on a data line (DL), in the writing process.

Further, a line 1243 is connected to a gate of T8 in each LED in the row so that the T8 is conductive when the RDC control signal is at the associated on level. When T8 is conductive, the LED can receive power from the power line. T8 is non-conductive when the RDC control signal is at the associated off level, so that the LED cannot receive power from the power line.

As discussed, the panel power can be turned on and off according to the PDC control signal which is applied to the gate of T1 via a line 1241. A reset transistor T5 is connected to each data line.

Other variations of the circuits of FIG. 12A-12D are possible as well.

The storage device and working memory are examples of tangible, non-transitory computer- or processor-readable storage/memory devices. Storage devices include volatile and nonvolatile, removable and non-removable devices implemented in any method or technology for storage of information such as computer readable instructions, data structures, program modules or other data. Computer storage devices include RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A head-mounted display device, comprising:
a microdisplay, the microdisplay is configured to display an augmented reality image and comprises a panel of light-emitting diodes arranged in rows;
a sensor, the sensor is configured to sense an angular velocity of a user's head; and
at least one control circuit, the at least one control circuit, to reduce motion blur of the augmented reality image, is configured to control the microdisplay responsive to the angular velocity by concurrently decreasing a row duty cycle of the rows and increasing a panel duty cycle of the panel.

2. The head-mounted display device of claim 1, wherein:
a decrease in the row duty cycle is proportional to an increase in the panel duty cycle so that an on time for each light-emitting diode and, therefore, a brightness level of the panel, is substantially constant during a frame period of the augmented reality image.

3. The head-mounted display device of claim 1, wherein:
the row duty cycle is decreased and the panel duty cycle is increased in proportion to the angular velocity.

4. The head-mounted display device of claim 1, wherein:
the angular velocity is in an azimuthal direction with respect to a coordinate system of the head-mounted display device.

5. The head-mounted display device of claim 1, wherein:
for each row, the row duty cycle is provided according to a respective row duty cycle control signal which transitions from an associated on level to an associated off level;
the panel duty cycle is provided according to a panel duty cycle control signal which transitions between associated on and off levels; and
the light-emitting diodes of each row are on when the row duty cycle is at the associated on level concurrently with the panel duty cycle being at the associated on level, and are off at other times.

6. The head-mounted display device of claim 1, wherein:
each light-emitting diode comprises a capacitor which is charged to a desired level according to a desired brightness of the light-emitting diode; and
for each light-emitting diode, the capacitor is in a charged state when a respective row duty cycle control signal is at an associated on level and in a discharged state when the respective row duty cycle control signal transitions to an associated off level.

7. The head-mounted display device of claim 6, wherein:
for each light-emitting diode, the capacitor is provided in the discharged state by writing blackout data to the light-emitting diode.

8. The head-mounted display device of claim 1, wherein:
the augmented reality image comprises a frame of image data which is written to the light-emitting diodes in a frame period;
the panel has an angular resolution;
the at least one control circuit is configured to determine a number of pixels which are subtended in the frame period according to a product of the angular velocity and the angular resolution and the frame period, each pixel comprising one or more of the light-emitting diodes; and
the row duty cycle is decreased and the panel duty cycle is increased according to the number of pixels which are subtended in the frame period.

9. The head-mounted display device of claim 1, wherein:
the augmented reality image is locked to a fixed location in a world coordinate system while the row duty cycle of the rows is creased and the panel duty cycle of the panel is increased.

10. A method for controlling a head-mounted display device, comprising:
displaying an augmented reality image using a panel of light-emitting diodes arranged in rows;
sensing a rotation of a user's head; and
determining when the rotation indicates that motion blur of the augmented reality image may occur; and
when the rotation indicates that motion blur of the augmented reality image may occur, reducing or avoiding the motion blur by concurrently decreasing a row duty cycle of the rows and increasing a panel duty cycle of the panel.

11. The method of claim 10, wherein:
the rotation indicates that motion blur of the augmented reality image may occur when an angular velocity of the head exceeds a threshold.

12. The method of claim 10, wherein:
a decrease in the row duty cycle is proportional to an increase in the panel duty cycle so that an on time for each light-emitting diode and, therefore, a brightness level of the panel, is substantially constant during a frame period of the augmented reality image.

13. The method of claim 10, wherein:
for each row, the row duty cycle is provided according to a respective row duty cycle control signal which alternates between associated on and off levels;
the panel duty cycle is provided according to a panel duty cycle control signal which alternates between associated on and off levels; and
the light-emitting diodes of each row are on when the row duty cycle is at the associated on level concurrently with the panel duty cycle being at the associated on level, and are off at other times.

14. The method of claim 10, wherein:
the augmented reality image is locked to a fixed location in a world coordinate system during the rotation of the user's head over multiple frames of the augmented reality image.

15. A computer-readable hardware memory having computer-readable software embodied thereon for programming a processor to perform a method for controlling a head-mounted display device, the method comprising:
controlling a panel of light-emitting diodes arranged in rows to display an augmented reality image, the controlling comprises setting a row duty cycle of the rows at an associated initial level and setting and a panel duty cycle of the panel at an associated initial level;
determining that a user's head is rotating during a time period; and
during the time period, setting the row duty cycle at a lower level than the associated initial level of the rows and setting the panel duty cycle to a higher level than the associated initial level of the panel.

16. The computer-readable hardware memory of claim 15, wherein:
the lower level and the higher level are in proportion to an angular velocity of the user's head.

17. The computer-readable hardware memory of claim 15, wherein the method performed further comprises:

after the time period, setting the row duty cycle at the associated initial level of the rows and setting the panel duty cycle at the associated initial level of the panel.

18. The computer-readable hardware memory of claim 15, wherein:

the time period extends over multiple frame periods of the augmented reality image.

19. The computer-readable hardware memory of claim 15, wherein:

the augmented reality image is locked to a fixed location in a world coordinate system.

20. The computer-readable hardware memory of claim 15, wherein:

a brightness level of the panel, is substantially constant during the time period.

\* \* \* \* \*